(12) United States Patent
Duffy et al.

(10) Patent No.: US 7,940,756 B1
(45) Date of Patent: May 10, 2011

(54) DYNAMIC TAGGING OF NETWORK DATA BASED ON SERVICE LEVEL OBJECTIVES

(75) Inventors: Stephen Duffy, Raleigh, NC (US); Hans F. van Rietschote, Sunnyvale, CA (US); Slava Kritov, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 707 days.

(21) Appl. No.: 11/286,617

(22) Filed: Nov. 23, 2005

(51) Int. Cl.
*H04L 12/56* (2006.01)

(52) U.S. Cl. ........ 370/389; 370/235; 370/352; 370/466; 370/469; 709/223; 709/225

(58) Field of Classification Search .................. 370/328, 370/338, 352, 466, 474, 235, 503; 709/223, 709/225, 228, 220, 203
See application file for complete search history.

(56) References Cited

U.S. PATENT DOCUMENTS

| | | | | |
|---|---|---|---|---|
| 2002/0065907 A1* | 5/2002 | Cloonan et al. | ............... | 709/223 |
| 2002/0075805 A1* | 6/2002 | Gupta et al. | ................... | 370/235 |
| 2002/0087623 A1* | 7/2002 | Eatough | ........................ | 709/203 |
| 2002/0131400 A1* | 9/2002 | Tinsley et al. | ................ | 370/352 |
| 2002/0163935 A1* | 11/2002 | Paatela et al. | ................. | 370/466 |
| 2003/0097443 A1* | 5/2003 | Gillett et al. | .................. | 709/225 |
| 2004/0202197 A1* | 10/2004 | Gao et al. | ........................ | 370/469 |
| 2007/0078955 A1* | 4/2007 | Siliquini et al. | .............. | 709/220 |

OTHER PUBLICATIONS

Porter, Thomas; "The Perils of Deep Packet Inspection" ; Paper; Jan. 11, 2005; Internet; SecurityFocus; http://www.securityfocus.net/infocus/1817.

Metzler, Jim; "WAN Optimization: A Proactive Approach"; Survey; Nov. 2005; Ashton, Metzler & Associates.
Welcher, Peter J.; "Introduction to MPLS"; Article; Aug. 7, 2000; Internet: Chesapeake Netcraftsmen; http://www.netcraftsmen.net/welcher/papers/mplsintro.html.
Welcher, Peter J.; "BGP and MPLS-Based VPNs"; Article; Oct. 4, 2000; Internet: Chesapeake Netcraftsmen; http://www.netcraftsmen.net/welcher/papers/mplsvpn.html.
Rajahalme, J., et.al.; "IPv6 Flow Label Specification"; Memo; 2004; The Internet Society; http://www.faqs.org/ftp/rfc/pdf/rfc3697.txt.pdf.
Betts, Bryan; "In Pursuit of the Self-Optimising WAN"; Article; Nov. 10, 2005; Internet; Techworld; http://www.techworld.com/features/index.cfm?featureID=1958&printerfriendly=1.
Semeria, Chuck; "RFC 2547bis: BGP/MPLS VPN Fundamentals"; White Paper; 2001; Internet; Juniper Networks, Inc.; http://www.techworld.com/features/index.cfm?featureID=1958&printerfriendly=1.

(Continued)

*Primary Examiner* — Robert W Wilson
*Assistant Examiner* — Mohamed Kamara
(74) *Attorney, Agent, or Firm* — Meyertons, Hood, Kivlin, Kowert & Goetzel, P.C.; Dean M. Munyon

(57) ABSTRACT

A system for dynamic tagging of network data based on service level objectives comprises one or more processors and memory coupled to the processors. The memory comprises program instructions executable by the processors to identify a service level objective associated with a particular task that comprises a transmission of data packets over a network on behalf of an application, where the network includes one or more devices (such as routers, switches, etc.) configured to provide different levels of service to data packets based at least in part on service level indicators included within the packets. The instructions are executable to dynamically generate service level indicators corresponding to the identified service level objectives for inclusion in the data packets of the task, and to transmit the packets including the service level indicators into the network.

19 Claims, 6 Drawing Sheets

OTHER PUBLICATIONS

Wijen, B.; "Textual Conventions for IPv6 Flow Label"; Memo; Sep. 2003; Internet; The Internet Society; http://www.faqs.org/ftp/rfc/pdf/rfc3595.txt.pdf.

Busi, Italo; "Sonet/SDH Virtual Concatenation for RPR"; Power Point Presentation; Sep. 2001; San Jose IEEE 802.17 Meeting; Internet; Alcatel; http://www.ieee.902.org/17/documents/presentations/sep2001/ib_vconc_02.pdf.

"Implementing Routing Policy on Cisco IOS XR Software"; Manual; 2004; Internet; Cisco Systems, Inc.; http://www.cisco.com/en/US/docs/ios_xr_sw/iosxr_r3.0/routing/configuration/guide/rc3rpl.pdf.

"What is 'Deep Inspection'?"; Article; May 6, 2005; Internet; http://www.ranum.com/security/computer_security/editorials/deepinspect/index.html.

"Leveraging Transport for Data Services with Virtual Concatenation (VCAT) and Link Capacity Adjustment Scheme (LCAS)"; White Paper; 2003; Internet; Cisco Systems, Inc.; http://www.cisco.com/warp/public/cc/so/neso/meso/meipac/lcas_wp.pdf.

* cited by examiner

DYNAMIC TAGGING OF NETWORK DATA BASED ON SERVICE LEVEL OBJECTIVES

BACKGROUND OF THE INVENTION

1. Field of the Invention

This invention relates to computer systems and, more particularly, to tagging of network data packets in computer systems based on service level objectives.

2. Description of the Related Art

In today's highly interconnected computing environment, hardware and software from a variety of different vendors may be used in order to process service requests submitted by enterprise application clients. For example, when a user of a web-enabled stock trading application issues a request to buy shares using a web browser running on a personal computer (PC), the web browser and the operating system at the user's PC may be provided by a first vendor, the web application interface to the stock trading application may have been developed by another vendor, the PC hardware components (which may have been manufactured by a variety of vendors) may have been assembled by a different vendor, and so on. Various networking devices such as switches, routers etc. linking the PC to a server at the stock trading application provider, and the stock trading application provider to a stock exchange, may also be managed by different vendors.

A user's request may be transformed at various stages during request processing: e.g., from various text form entries submitted by the user, one or more protocol-specific encrypted data packets may be generated on the client PC, examined and potentially modified at intermediate nodes of the network, and reassembled at a server managed by the stock trading application provider as a purchase request. The server at the stock trading application provider may generate its own network message or messages to a stock exchange or a seller of the stock, which may also be transformed on their way to the seller. No single entity may typically manage all aspects of the communication required to process even relatively simple service requests; thus, responsibility and control of application data flow may be distributed across multiple service providers and vendors. In many cases, for example, enterprise application providers may rent connectivity across wide area networks from telecommunication carriers, but the enterprise application providers may have no control over the underlying network infrastructure managed by the carriers.

As more and more application data traffic is transported across third-party networks such as the wide area networks managed by telecommunication carriers, the need for providing differentiated levels of service across heterogeneous resource paths has been recognized. Techniques such as MPLS (Multi-Protocol Label Switching) have been developed at least in part for tagging data packets to indicate desired levels of service. However, these schemes are typically deployed statically, e.g., the service level objectives may be tied to statically selected network port numbers or IP addresses. Applications that are intended to support different levels of services for different tasks or jobs—e.g., to provide a higher quality of service to an online order for goods worth a million dollars than to an order for goods worth ten dollars—may not be able to utilize such static techniques effectively. Although networking experts have implemented various types of sophisticated network traffic management techniques, in many cases communication gaps continue to exist between the detailed and dynamically changing application knowledge typically available to enterprise software vendors and the network management expertise typically available within network service providers: that is, the detailed application knowledge is typically not used to make traffic management decisions. Bridging such communication gaps may lead to more effective utilization of network infrastructures from an application perspective than is usually possible today.

SUMMARY

Various embodiments of systems and methods for dynamic tagging of network data based on service level objectives are disclosed. According to one embodiment, a system comprises one or more processors and memory coupled to the processors. The memory comprises program instructions executable by the processors to identify a service level objective associated with a task that comprises a transmission of data packets over a network on behalf of an application, where the network includes one or more devices (such as routers, switches, etc.) configured to provide different levels of service to data packets based at least in part on service level indicators included within the packets. The instructions are executable to dynamically generate service level indicators corresponding to the identified service level objectives for inclusion in the data packets of the task, and to transmit the packets including the service level indicators into the network. On receiving a tagged packet, a network device may take specific types of actions—e.g., select a given path within the network from among a plurality of available paths—based on the packet's service level indicator. In this way, application-specific knowledge (such as the relative priority of two different backup tasks, or the rate at which two different customers are being charged for services provided by the same application in a tiered pricing model) may be used to guide the manner in which data is transmitted over a network that may not be controlled by the application vendor. For example, data packets being transmitted for an online bid of ten thousand dollars for an auctioned item may be tagged as being more important, and therefore requiring shorter response times, than data packets being transmitted simply to browse for items at the same auction web site. The packets tagged as being more important may, for example, be routed over a less congested path, or a shorter path, to their destination than the less important packets.

Multiple data packet streams or flows corresponding to different tasks or jobs for the same application may be concurrently transmitted over the network in some embodiments, with different service level indicators included in the packets of the respective streams. Thus, at the same time that a given packet P1 with a particular service level indicator SLI1 is in transit in the network, another packet P2 generated on behalf of the same application, and potentially transmitted using the same network port, may also be in transit with a different service level indicator SLI2. In some embodiments, the instructions executable to identify the service level objectives and to generate the service level indicators may be incorporated within a service level manager that runs at one or more network endpoints (e.g., at a host or server where the application is executed). The service level manager may also be configured to communicate with a policy engine responsible for coordinating network traffic in order to achieve the application-specific or task-specific service level objectives. The policy engine may, for example, be configured to manage network traffic on the basis of a set of rules or policies by setting up network routing tables, issuing directives to various network devices to refresh or modify their routing tables, etc. The service level manager may transmit a configuration request to the policy engine requesting a desired level of service for a particular packet stream in some embodiments.

In one embodiment, the service level manager may send a request to the policy engine to determine the format or values to be included within service level indicators in the data packets. In one embodiment, responses received from the policy engine (which may for example indicate whether requests for desired service levels were accepted or rejected by the policy engine) may be logged by the service level manager, and the logged responses may later be used for various purposes such as renegotiating service level agreements. In some embodiments, for example to reduce the load that might otherwise be generated at the policy engine as a result of large numbers of requests for service level objectives for different packet streams, a number (e.g., thousands) of tags or service level indicators corresponding to various desired levels of service may be allocated or set up in advance. In such embodiments, a selected pre-allocated tag may initially be inserted into the data packets of a particular data stream, and if the level of service obtained using the initial pre-allocated tag is found to be insufficient, a different pre-allocated tag indicating a higher level of desired service may then be inserted in subsequent packets of the stream without requiring a communication with the policy engine to implement the change in tags.

Various types of networking devices and protocols may be used in the network in different embodiments, such as IP over Ethernet, ATM (Asynchronous Transfer Mode), Frame Relay, SONET (Synchronous Optical Network)/SDH (Synchronous Digital Hierarchy), DWDM (Dense Wavelength Division Multiplexing), etc. Portions of the network connecting application endpoints may include Wide Area Networks (WANs) managed by telecommunication carriers in some embodiments. The service level indicators may be implemented using MPLS tags, IPv6 flow labels, QoS (Quality of Service) bits, Virtual LAN identifiers, or any other packet-tagging scheme in various embodiments, as desired. In some embodiments, the dynamic tagging scheme for data packets may be used in environments where enterprise network traffic enters a telecommunication carrier-managed cloud via an optical or TDM (Time Domain Multiplexing)/circuit based device. In such embodiments, the dynamically inserted tags may be used to provide application awareness in conjunction with techniques such as Virtual Concatenation (VCAT) and Link Capacity Adjustment Scheme (LCAS).

Figure 1:
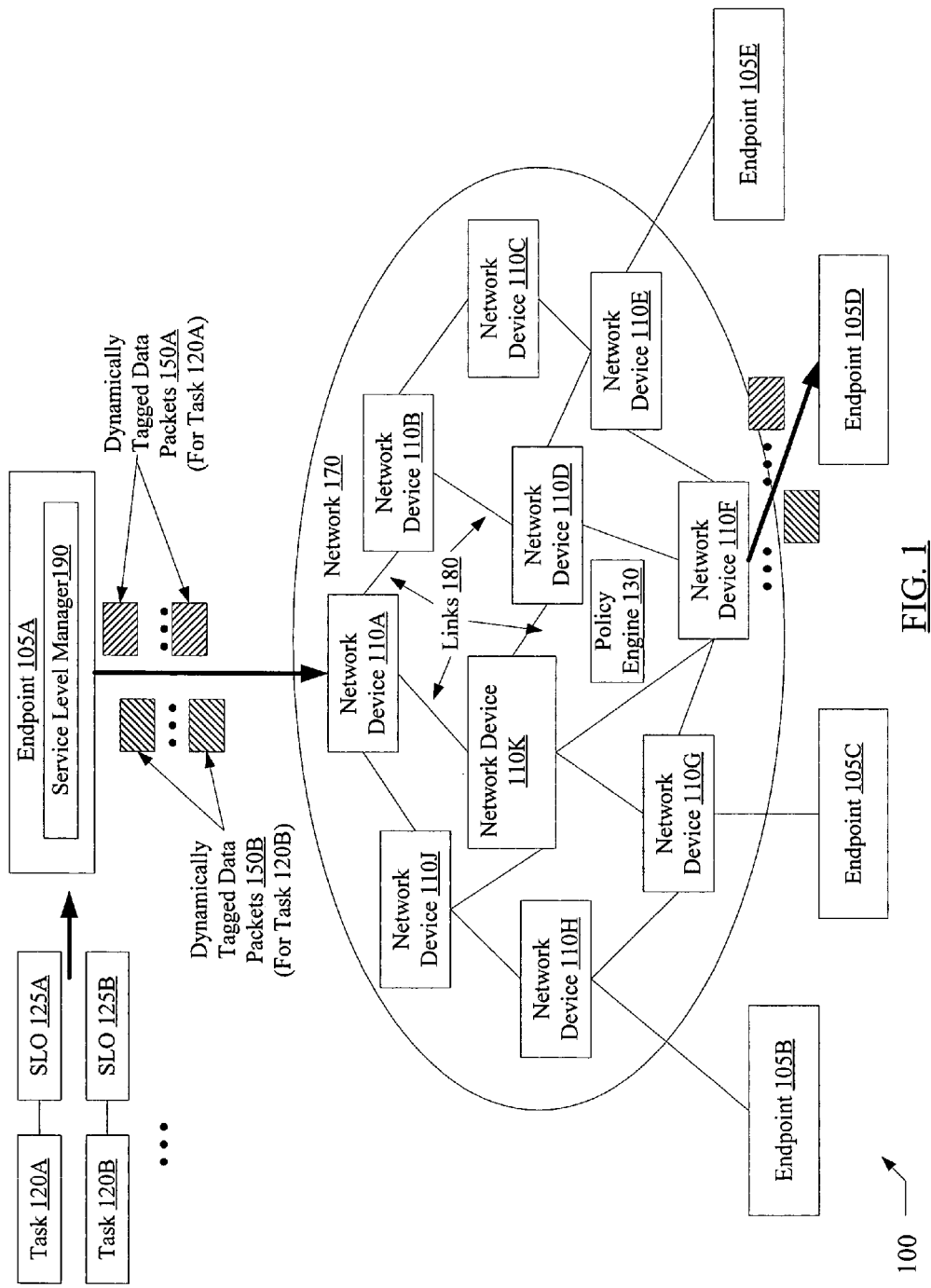
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a network 170 linking a plurality of network devices 110 (e.g., devices 110A-110K) and a plurality of endpoints 105 (e.g., endpoint 105A-105E). Each network device 110 and each endpoint 105 is connected to at least one other network device or endpoint via one or more links 180 (which may include physical links, wireless links, or both physical and wireless links in various embodiments). The network 170 may also include one or more policy engines 130 (which may also be referred to herein as policy managers 130) configured to coordinate traffic flow in accordance with a set of rules or policies, as described below in further detail. The endpoints 105 may include, for example, various computing devices such as servers, workstations, personal computers, personal digital assistants, etc., each of which may be configured to execute various applications on behalf of clients. A wide variety of applications may be executed at the endpoints, from single-user applications such as word processors, spreadsheets, etc., to enterprise level applications such as database systems, storage management applications such as data replication applications, backup/restore applications, web servers, J2EE™ (Java™ 2 Enterprise Edition) application servers, etc. The network devices 110 may include any desired types of switches, routers and other networking equipment configured to support any of a variety of different types of communication protocols and standards such as various versions of IP (Internet Protocol) over Ethernet, ATM (Asynchronous Transfer Mode), Frame Relay, SONET (Synchronous Optical Network)/SDH (Synchronous Digital Hierarchy), DWDM (Dens Wavelength Division Multiplexing), etc. Data may be transmitted between different endpoints 105 on behalf of applications: e.g., a file replication application at endpoint 105A may be configured to transmit file data as a series of data packets over network 170A to endpoint 105D, user input at an e-commerce application interface at endpoint 105B may result in a stream of data packets being exchanged with endpoint 105C, etc. Data may be transmitted in either direction in a client-server relationship between two endpoints, or in either direction in a peer-to-peer relationship, for example. In some cases several endpoints 105 may belong to the same corporate entity—e.g., endpoint 105A may be located at the corporate headquarters of a given company, and endpoints 105C and 105D may be located at branch offices of the same company—while some or all of the network devices 110 may be owned and/or managed by a different corporate entity. In other cases, a source endpoint (the endpoint 105 from which data packets are transmitted) may be owned or managed by a different entity than a destination endpoint (the endpoint at which the data packets from the source endpoint are received) and/or portions of the network 170. The endpoints 105 may all exist within a single campus in some embodiments, and may be spread over a metropolitan area, at different cities within a country, or across countries or continents in various embodiments.

At least some of the network devices 110 may be configured to provide different levels of service to different data packets based at least in part on service level indicators such as tags that may be included in the packets. A wide variety of service level indicators may be used in different embodiments. For example, as described below in further detail in conjunction with the description of FIG. 2, in some embodiments network 170 may support Multiprotocol Label Switching (MPLS), in which network routers may assign labels or tags to each packet entering the network to enable packet forwarding decisions to be made based on the contents of the label, thus simplifying routing decisions compared to techniques that may require complex route lookups based on destination IP addresses. In other embodiments, labels or tags may be implemented within IP packet headers, e.g., in IP version 6 flow labels fields, as QoS (Quality Of Service) bits, virtual LAN identifiers, etc. Endpoint 105A may include a service level manager 190 configured to utilize application-specific knowledge, such as knowledge of the relative importance of different tasks performed using a given application, to drive network traffic in accordance with application-specific goals.

Service level manager 190 may be configured to identify service level objectives associated with various tasks performed using applications running on endpoint 105A, and to generate service level indicators corresponding to the objectives for inclusion within the data packets generated for the tasks. The service level objectives may differ for different tasks or jobs performed using the same application in some embodiments. For example, a purchase order request submitted via an electronic commerce application may be given a higher priority than requests to browse a catalog using the same electronic commerce application. Accordingly, data packets corresponding to the purchase order may be labeled or tagged to obtain preferred treatment (such as transmission over less congested or shorter routes) in network 170 compared to the treatment of the data packets of the browse requests. Similarly, in some embodiments where a service provider may charge different clients at different rates for services such as remote backup using a tiered pricing model, a backup on behalf of a premier customer being charged at a higher rate may be given preferential treatment compared to a backup being performed concurrently for another customer being charged the standard backup rate. Service level manager 190 may be configured to dynamically generate service level indicators such as MPLS tags or IP flow label contents, and to add the indicators at the appropriate locations within the packets generated for the application tasks. For example, as shown in FIG. 1, data packets 150A generated on behalf of task 120A with service level objective (SLO) 125A may be tagged with different service level indicators than data packets 150B generated on behalf of task 120B with SLO 125B. The dynamically tagged data packets may then be transmitted from one endpoint 105A over the network 170 to one or more destination endpoints, such as endpoint 105D in FIG, with the specific path or route taken by a particular packet or packet stream being selected at least partly on the basis of the included service level indicators in some embodiments.

Service level manager 190 may be configured to identify any of a variety of different types of service level objectives 125 in different embodiments. Service level objectives may initially be specified at a relatively high level using contracts or service level agreements between the customers of a service and one or more providers of the service. Such agreements may specify, for example, desired response times for defined types of transactions (e.g., maximum delay between a submission of a stock trade order and the completion of the order), desired job completion throughputs for various categories of tasks or jobs (e.g., gigabytes backed up per hour from a branch office to a disaster recovery backup site), desired reliability metrics (e.g., data on a local disk of a customer's workstation is to be restored from a remote backup within two hours after a disk crash), etc. Some service level agreements may also allow application users to specify different service level objectives on a per-request or a per-job basis from among a set of objectives defined in the agreement. The terms "job", "task", "application job" and "application task" may be used synonymously herein to represent a set of operations performed in response to a request from a client of one or more applications; examples of tasks include a backup of a client file system or disk, a transmission of a video or audio file, an online banking operation such as a bill payment, etc. The request for a task may originate from a human user (e.g., a bank customer using a web-based interface), and/or from another application or program (e.g., an automated backup service) in various embodiments.

When a particular task 120 is initiated at an application at an endpoint 105, the service level manager 190 may be configured to detect a set of one or more specific service level objectives 125 associated with that task (such as a priority or a response time target), e.g., on the basis of input provided by a requester using an interface such as an HTML form that triggers the task, by looking up the service level objectives in a database using the requester's identity as a key, etc. In addition, after determining the specific objectives to be implemented, in some embodiments the service level manager 190 may be configured to communicate with one or more policy engines 130 responsible for traffic management policies within network 170, e.g., to determine the specific manner or format in which data packets should be marked or tagged to achieve the identified service level objectives, and/or to request that packets tagged with specific tags be given special treatment in network 170. Policy engines 130 may be implemented by network service providers responsible for one or more of the network devices 110, and may in some embodiments be resident at one or more of the network devices 110. Policy engines 130 may be configured to issue directives or control messages to one or more network devices 110 in order to implement various types of policies or rules, and may in some embodiments provide application programming interfaces (APIs) allowing external entities such as service level manager 190 to communicate with the policy engines. In one embodiment, instead of communicating directly with policy engines, service level manager 190 may be configured to send requests targeted at the policy engines to an intermediary service such as HP OpenView from the Hewlett Packard Corporation, and the intermediary service may be configured to transmit the request to the policy engines.

Intermediary services may be used, for example, to translate generic or network-agnostic requests from service level managers 190 into network-specific requests in some embodiments. In one embodiment, one or more scripts (which may be termed notify scripts) may be executed prior to and at the end of each application task, and the scripts may be used by service level manager 190 to communicate with policy engines 130 to enable or disable support for desired service levels for the application task within the network.

In some embodiments, the policy engine or engines 130 may return a response (either directly or via an intermediary service) to the service level manager 190 indicating whether the request for special treatment for a given task's data packet stream is rejected or accepted. The service level manager 190 may be configured to log rejections (e.g., in a log file or database stored in persistent storage at an endpoint 105) received from policy engines 130 in some embodiments, e.g., so that a record is kept of the service level actually provided by the network service provider responsible for the policy engine. In some embodiments, service level manager 190 may log additional interactions with the policy engines 130: e.g., both acceptances and rejections of requests may be logged. The logged information may potentially be used, for example, to settle disputes about responsibilities for failures to meet service level objectives, to determine whether service level agreements need to be modified or renegotiated, and so on.

In some embodiments, for example to reduce the load that might otherwise be generated at the policy engine 130 as a result of large numbers of requests for service level objectives for different packet streams, a number (e.g., thousands) of tags or service level indicators corresponding to various desired levels of service may be allocated or set up in advance. In such embodiments, a selected pre-allocated tag may initially be inserted into the data packets of a particular data stream, and if the level of service obtained using the initial pre-allocated tag is found to be insufficient, a different pre-allocated tag indicating a higher level of desired service may then be inserted in subsequent packets of the stream in real time without requiring a communication with the policy engine to implement the change in tags. Such a pre-allocation scheme may reduce the overall amount of communication required with policy engine 130—e.g., the set of pre-allocated tags may be modified or changed in coordination with the policy engine 130 only during maintenance windows rather than during period of normal operation, making the set of tags available and at least part of the operation of policy engine 130 effectively static between maintenance windows. In addition, pre-allocation of tags may also help to simplify billing—users of the tags may simply be charged based on the numbers of packets sent using the different pre-allocated tags. In one example of the use of pre-allocated tags, the packets corresponding to a particular backup operation or job may initially be tagged using relatively low-priority pre-allocated tags. If the time window in which the backup operation is to be completed is about to expire, however, and the backup operation is not yet completed, a different pre-allocated tag indicating a higher priority may be used. The change in priority may be logged or recorded, for example to help in re-negotiating subsequent contracts or service level agreements. In another example, different pre-allocated tags may be used for packets at different stages of an online auction bid interaction—e.g., as the time at which an auction for a particular item is scheduled to be completed approaches, higher-priority pre-allocated tags may be used than were used at earlier stages of the bid.

In one embodiment, the service level manager 190 may cache information on how service level objectives 125 are to be mapped to packet-level service level indicators or tags, so that a separate communication with a policy engine 130 may not be needed for each task 120. The marking or tagging of the data packets 150 to indicate the desired service level may be done at various levels of a software stack in different embodiments: for example, data packets may be marked at a network filter driver layer between a TCP/IP stack and a network card driver layer, as described below in further detail in conjunction with the description of FIG. 3. Once the tagged data packets 150 enter network 170, the manner in which the tags are processed at the various network devices 110 may differ, depending for example on the specific tagging techniques used, the networking protocol implemented in network 170, etc. In some cases, for example where MPLS is used, a network device 110 such as a router may examine each incoming data packet for the presence of a tag indicating service level objectives, use the tag (if one is found) to make a decision such as a selection of a route, and replace the existing tag with a new tag. In other embodiments, tags may remain unchanged within the data packets during transmission: e.g., while one or more network devices 110 may be configured to read the tags and take actions in response to the contents of the tags, the tags may not be modified along the route taken to the destination endpoint. In some embodiments, the receiving endpoint (e.g., 105D) may be configured to track how effectively the desired service level objectives were met; e.g., the data packets may include timestamps indicating when they were transmitted from a sending endpoint such as 105A, and a service level manager 190 at a receiving endpoint may log the actual time taken for the transmission. In addition to the service level indicators included in the data packets themselves, other factors such as the current level of congestion on one or more network links 180 or a detection of a network or link failure may also be used in providing different levels of service (such as selecting different routes) for various data packets 150 in some embodiments at a given network device 110.

It is noted that in various embodiments, the granularity at which service level objectives are associated with application data to be transmitted over a network 170 may differ. For example, in some embodiments, each task, job or transaction (as defined by the application or applications) may potentially have a different service level objective associated with it. In other embodiments, all the tasks for a given application (such as a backup application, a distributed database management application, or an enterprise resource planning (ERP) application) may be given the same priority or service level objective. Even in embodiments where different service level objectives may be supported for different tasks of an application, the actual service level objectives selected for a plurality of tasks may be identical in some cases. In one embodiment, service level objectives may also be set on a per-connection or per-port basis (e.g., based on a sender address, a receiver address, or a combination of sender and receiver addresses). It is also noted that service level manager 190 may be configured to generate and insert tags indicating service level objectives for data packets even in embodiments where the network 170 is managed or owned by the same corporate entity that owns or manages the endpoints 105; i.e., the techniques described above may be used independently of the ownership or control of the various elements illustrated in FIG. 1. In some embodiments, in addition to including service level objective information in data packets sent over network 170, service level manager 190 may be configured to coordinate management of one or more non-network resources in order to achieve the desired levels of service. For example, service level manager 190 may be configured to use priority scheduling at CPUs and/or storage devices at endpoints 105. Coordinating the use of multiple types of resources to achieve desired service level objectives may help to prevent problems such as priority inversion, where for example a first task 120A may be given a higher priority than a second task 120B at one resource (e.g., in network 170), but may be prevented from making as much progress as it could because the second task 120B is given a higher priority at another resource (such as a CPU).

Figure 2:
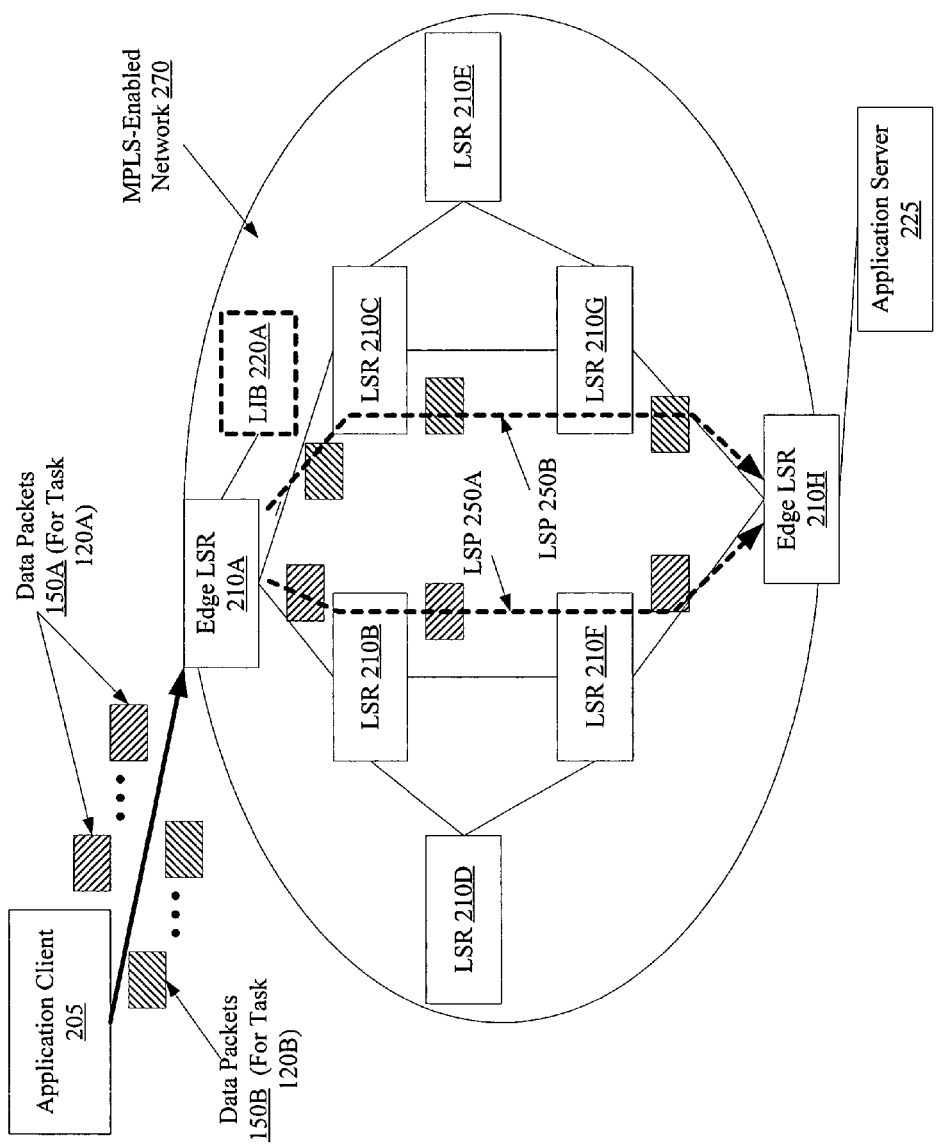
FIG. 2 is a block diagram illustrating an embodiment where an application client endpoint is linked to an application server endpoint via an MPLS-enabled network.

FIG. 2 is a block diagram illustrating an embodiment where an application client endpoint 205 is linked to an application server endpoint 225 via an MPLS-enabled network 270. Routers in an MPLS-enabled network may be termed "label switch routers" or LSRs 210. An LSR (e.g., 210A or 210H) that is connected to a non-LSR (such as application client 205 or an application server 225) may also be termed an "edge" LSR or a "label edge router" (LER). Incoming packets 150 of a given packet stream (e.g., a stream of packets 150A corresponding to a task 120A, or a stream of packets 150B corresponding to a task 120B) received at an edge LSR 210A are each assigned a label or tag (e.g., a small identifier) indicative of a service level objective 125 for the corresponding task 120. Each LSR 210 may have access to a label information base (LIB) 220—e.g., LSR 210A may have access to LIB 220A—that is used to determine to which LSR 210 a given packet 150 should next be forwarded. (It is noted that while for clarity, only a single LIB 220A is shown in FIG. 2, each of the other LSRs may also access respective LIBs in some embodiments.) A LIB 220 may, for example, comprise one or more tables mapping each combination of (incoming interface, incoming label) to a corresponding combination of (outgoing interface, outgoing label). That is, on receiving a data packet 150 from on a particular interface, an LSR 210 may consult its LIB 220 to determine on which outgoing interface the data packet should be transmitted to the next LSR, and how the packet should be labeled. LIBs 220 may be set up in accordance with policies implemented by a policy manager 130 (not shown in FIG. 2) in the MPLS-enabled network 270. Service level manager 190 (also not shown in FIG. 2) at an application client 205 and/or at application server 225 may be configured in some embodiments to communicate with a policy manager 130 to set up or modify the LIBs 220 so that desired service level objectives may be met. By setting up appropriate LIBs, packet streams corresponding to different service level objectives may be transmitted across different paths (which may be termed label switch paths (LSPs)) 250 in an MPLS-enabled network. For example, as shown, data packets 150A corresponding to task 120A may be transmitted over an LSP 250A comprising LSRs 210A, 210B, 210F and 210H before reaching application server 225, and data packets 150B corresponding to task 120B may be transmitted over an LSP 250B comprising LSRs 210A, 210C, 210G and 210H before reaching application server 225. LSPs 250 may in general be established by network operators for a variety of purposes in MPLS-enabled networks, such as to guarantee a certain level of performance, to route around network congestion, or to create IP tunnels for network-based private virtual networks (VPNs).

An MPLS-enabled network 270 may support any of a variety of underlying communication protocols, or a combination of protocols. In some IP-based MPLS-enabled networks, the label may be inserted prior to the IP header. In ATM MPLS-enabled networks, Virtual Path Identifier (VPI)/Virtual Channel Identifier (VCI) addressing may be used as the label. In Frame Relay networks, the DLCI (Data Link Connection Identifier) may be used as the label. In some embodiments, instead of being explicitly specified as a set of bits, labels may be at least partly implicit—e.g., in some types of optical networks, the wavelength of the transmission may potentially be used to indicate the label. A single LSP 250 may cross multiple Open System Interconnect (OSI) Layer 2 transports such as ATM, Frame relay or Ethernet in some embodiments. MPLS is designed to enable end-to-end circuits with specific performance characteristics across any types of transport medium, eliminating the need for overlay networks or control mechanisms restricted to a specific Layer 2 transport medium. Any of a variety of techniques may be used to generate and examine MPLS labels in different embodiments. An edge LSR 210H at which data packets 150 leave the MPLS-enabled network 270 may be configured to remove MPLS tags/labels in some embodiments, e.g., to avoid potential confusion when the packets reach devices that do not support or understand MPLS tags. It is noted that while FIG. 2 illustrates an application client 205 and an application server 225 as example endpoints, various other types of endpoints that may not necessarily represent a client-server relationship (e.g., endpoints implementing peer-to-peer relationships) may also utilize the functionality of service level manager 190 in an MPLS-enabled network.

In some embodiments, IPv6 (IP version 6) flow labels may be used, either alone or in combination with other mechanisms such as MPLS labels, to indicate desired service levels associated with data packet streams. The IPv6 flow label specification (as specified in RFC (Request For Comments) 3697 by the IPv6 Working Group of the Internet Engineering Task Force (IETF)) defines the generic requirements for flow state establishment using flow labels. According to the specification, a "flow" is a sequence of packets (e.g., packets 150A of FIG. 1) sent from a particular source to a particular unicast, anycast or multicast destination that the source desires to label as a flow. A flow may comprise all packets in a specific transport connection or a media stream, but does not necessarily have to be mapped to a transport connection. IPV6 source nodes supporting flow labeling are required to label known flows (e.g., TCP connections or application streams) even if the source node itself does not require flow-specific treatment. A 20-bit label flow field in the IPv6 header may be used to label the packets of a flow. A flow label of zero may be used to identify packets that are not part of any flow. The triplet of (flow label, source address, destination address) may be used to identify the flow to which a particular packet belongs. IPv6 flow labels may be retained during transmission (i.e., the labels generated at a source may be delivered unchanged to a destination). Service level manager 190 may be configured to generate appropriate labels conforming to the IPv6 flow label standards in various embodiments to indicate desired service level objectives for data packets 150, and network devices 110 may implement various specific techniques to support IPv6 flow labeling. Additional details on the specific requirements of IPv6 flow labeling may be found in the specifications related to RFC 3697 published by the IETF. IPv6 flow labels may be used in combination with other service level objective specification techniques (such as MPLS tags) in some embodiments. Other techniques such as Virtual LAN identifiers, Quality of Service (QoS) bits, etc., may also be used, either in isolation or in combination with one another, to specify service level objectives for data packets 150 in various embodiments.

In some embodiments, the dynamic tagging scheme for data packets described above may be used in environments where enterprise network traffic enters a telecommunication carrier-managed cloud via an optical or TDM (Time Domain Multiplexing)/circuit based device. In such embodiments, the dynamically inserted tags may be used to provide application awareness when the traffic reaches a digital cross-connect or optical switch that switches traffic at VT1.5 (1.5 Mbps) or STS-1 (52 Mbps) in conjunction with techniques such as Virtual Concatenation (VCAT) and Link Capacity Adjustment Scheme (LCAS). For example, burst-intensive applications sensitive to time-of-day considerations (i.e., applications that require different levels of service depending on the time of the day) may be able to take non-contiguous or stranded STS-1s and logically aggregate them into a single virtual group so that the transport layer channels in the core of the network provide a bandwidth group that better correlates with large access bandwidth that is enabled by Gigabit Ethernet, RPR/Resilient Packet Ring, etc. Tagging of data packets as described above may allow the network to implement such logical aggregations dynamically and/or with greater application awareness than may be possible using current techniques (in which, for example, a phone call or other communication may be needed from the enterprise customer to the carrier to implement the aggregation).

Figure 3:
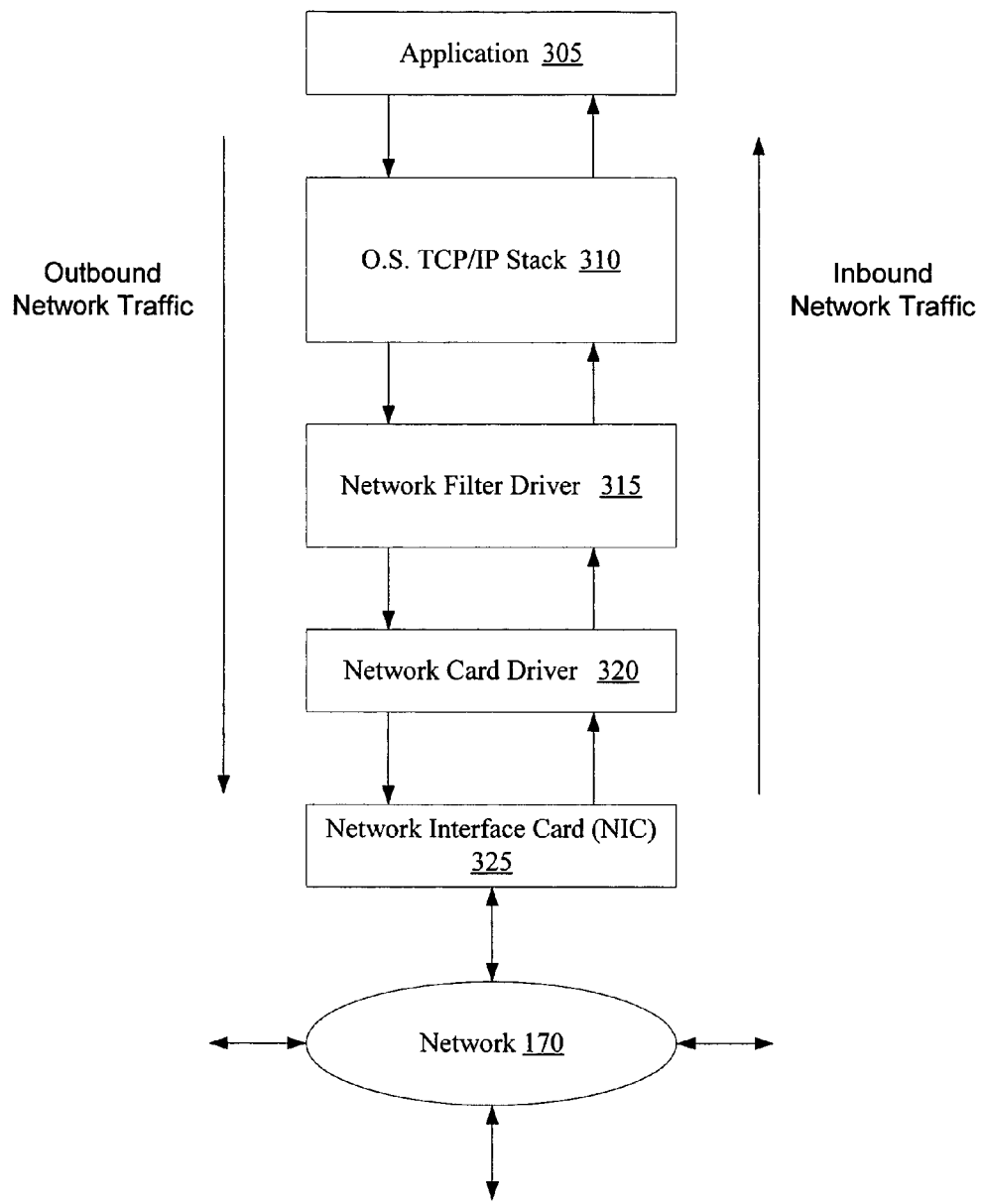
FIG. 3 is a block diagram illustrating a network filter driver that may be employed to generate and/or insert service level indicators in data packets at an endpoint, according to one embodiment.

FIG. 3 is a block diagram illustrating a network filter driver 315 that may be employed to generate and/or insert service level indicators in data packets 150 at an endpoint 105, according to one embodiment. As shown, the outbound network traffic may originate from one or more modules at an application layer 305 and may be passed through various layers of an operating system and a TCP/IP stack (310). Packets generated by the TCP/IP stack may be intercepted at the network filter driver layer 315 and labeled or tagged in accordance with identified service level objectives. The network filter driver may also be referred to as a miniport driver in some implementations. In some embodiments, the service level manager 190 may include a network filter driver layer 315 dedicated to dynamic tagging of data packets, while in other embodiments, the service level manager 190 may utilize functions or interfaces provided by a more general-purpose network filter driver layer 315 to tag the data packets (i.e., the network filter driver layer may perform other functions in addition to tagging data packets based on service level objectives). The tagged data packets may then be transmitted on to the network 170 through a network card driver 320 and a network interface card (NIC) 325.

Inbound network traffic may flow in the opposite direction at a destination endpoint 105: packets received from the network 170 may be passed through the NIC 325 to the network card driver 320. Before the incoming packets reach the TCP/IP stack, in some embodiments network filter driver layer 315 may remove part or all of the tags indicative of the service level objectives. The data packets may then be assembled as needed in the TCP/IP stack and the operating system before being passed to the application layer 305 at the destination endpoint 105.

In some embodiments, the application layer 305 may be configured to trigger the operations of service level manager 190 (including network filter driver layer 315): e.g., an application may determine whether or not its data packets (or the data packets of a specific job or task) are to include service level objective indicators, and to activate service level manager 190 if indicators are to be included. In some embodiments, the service level objective indicators may be inserted into the data packets 150 even if the underlying network is not guaranteed to support differential levels of service; e.g., in one environment, service level manager 190 may be configured to make a best effort to send data packets using network devices 110 that implement support for packet-level service level objectives, but if such devices are not available due to a temporary network outage or for some other reason, the tagged data packets may actually be transmitted over a path on which network devices 110 treat all packets equally.

Figure 4:
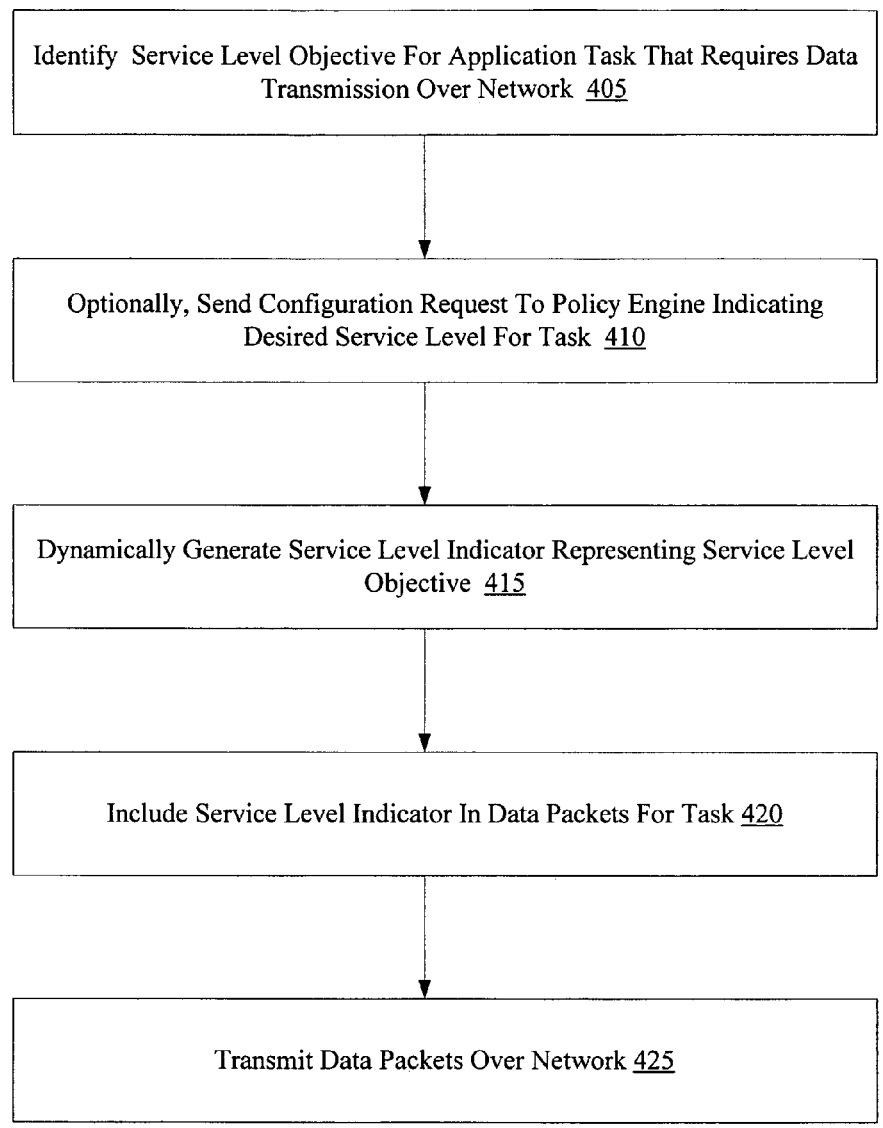
FIG. 4 is a flow diagram illustrating aspects of the operation of a service level manager, according to one embodiment.

FIG. 4 is a flow diagram illustrating aspects of the operation of service level manager 190, according to one embodiment. As shown in block 405, the service level manager 190 may be configured to identify a service level objective 125 for an application task 120 for which data is to be transmitted over a network 170. The service level objective may be identified using a variety of techniques as described above, e.g., on the basis of parameters supplied by a requester of the task, or based on an entry in a database that maps users to service level objectives, etc. Optionally, in some embodiments the service level manager 190 may be configured to send a configuration request to a policy engine 130 indicating the desired service level for the task, as shown in block 410. The policy engine 130, which may be configured to implement policies to manage traffic flow within network 170, may send a response to the configuration request to the service level manager 190 in some embodiments, e.g., indicating either acceptance or rejection of the request, and the service level manager 190 may be configured to log the response in such embodiments. In one embodiment, service level manager 190 may determine the specific contents and/or formats of service level indicators to be included in data packets of a particular task or application by querying policy engine 130.

The service level manager 190 may be configured to dynamically generate a service level indicator representing the service level objectives for a particular packet 150 or a stream of packets (block 415), include the indicator in the packet or packets (block 420), and transmit the packets into the network 170 (block 425). On receiving the tagged data packets, one or more network devices 110 may be configured to take specific types of actions (e.g., select a specific next hop of a route from among a set of alternative hops) based on the service level indicators. In some embodiments a service level manager 190 may be configured to track the extent to which the desired service level objectives are being met (e.g., on the basis of acknowledgments received from a destination endpoint that indicate how long it took for packets to be transmitted) for a given task 120, and to modify the service level indicators included in subsequent packets for the task. For example, in one implementation service level manager 190 may be configured to assign priority levels between 0 and 9 to data packets, where a higher priority level indicates a shorter response time objective. If assigning a priority level of 5 to the first few packets of a task 120 does not result in the desired objectives being met, the priority level may be raised to 6 or higher for subsequent packets (or a policy engine 130 may be contacted to indicate that the desired service levels are not being achieved and to take corrective actions). At any given point in time, multiple packet streams corresponding to different tasks performed using a given application may be being transmitted across network 170. In the example where priority values between 0 and 9 are assigned to data packets, a transmission of a first stream of packets with priorities set to 2 on behalf of a low-priority task may overlap at least partly in time with a transmission of a second stream of packets with priorities set to 8 for a higher-priority task performed using the same application. Packets for different tasks may be sent from the same port, or from different ports (some of which may be dynamically selected), at the sending endpoint. Similarly, packets for different tasks may be received at the same port, or at different ports, at the receiving endpoint.

Figure 5:
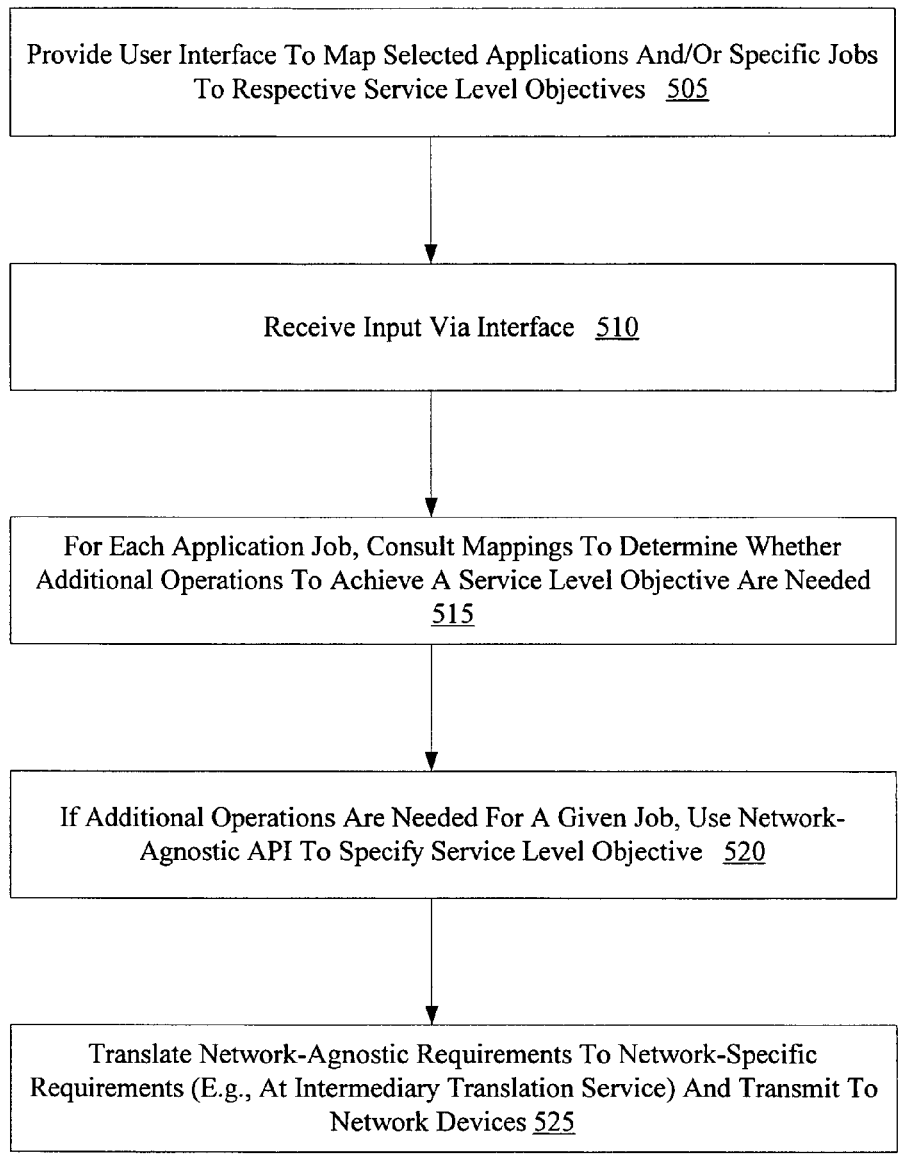
FIG. 5 is a flow diagram illustrating aspects of the operation of a service level manager according to an embodiment in which the service level manager is configured to provide an interface allowing a customer or client to select a particular service level objective from a menu of possible service level objectives for data transmission.

FIG. 5 is a flow diagram illustrating aspects of the operation of service level manager 190 according to an embodiment in which the service level manager is configured to provide an interface allowing a customer or client to select a particular service level objective from a menu of possible service level objectives for data transmission. For a backup application, for example, a web-based interface, a custom graphical user interface (GUI) or a command-line interface may be provided, allowing users or backup administrators to select priority levels for different backup jobs. A backup of a repository of source code shared by hundreds of developers in a software development environment may be given higher priority than a backup of an individual user's workstation using such an interface. In some embodiments, a default service level objective may be associated with each application at a given endpoint: e.g., an e-mail application may have a particular default service level objective associated with it, a backup application may have another default service level objective associated with it, an ERP application may have yet another default service level objective associated with it, and so on. A standardized menu showing the default service level objectives associated with various applications may be displayed or provided to users in such embodiments, and the menu may also allow the default service level objectives to be changed (to the extent the changes do not conflict with previously agreed-upon service level agreements, contractual obligations, etc.) for specific jobs or for all the jobs of a specific application.

As shown in block 505 of FIG. 5, the service level manager 190 may be configured to provide a user interface to map selected applications and/or jobs to service level objectives. In response to input received via the interface (block 510), new mappings (or modifications to existing mappings) may be stored, e.g., in a mapping database. For each application job that is started, the service level manager 190 may be configured to consult the existing mappings to determine whether any additional operations are required to meet the job's service level requirements (block 515). Some jobs may not need any special treatment, e.g., if they are classified as low-priority jobs. In the depicted embodiment, if additional operations are needed to meet the job's service level objectives, service level manager 190 may be configured to use a network-agnostic application programming interface (API) to specify the objectives (block 520). The network-agnostic request may then be translated into a network-specific request or a set of network-specific requests, e.g., at an intermediary translation service, before being sent to a policy engine 130 and/or to one or more network devices 110 (block 525).

In some embodiments, network-agnostic techniques may also or instead be used by service level manager 190 for purposes other than communication with policy engines 130. For example, in one embodiment, data packets 150 may be tagged initially in a network-agnostic manner by service level manager 130 to indicate desired service level objectives, and the network-agnostic tags may be translated at an intermediate service into network-specific tags before the packets are actually transmitted over the network.

In one embodiment, service level manager 190 may be configured to associate service level objectives with data packets based on external parameters that may not be specific to a given task—e.g., data transmissions initiated during peak working hours (e.g. between 8 AM and 6 PM) in a given time zone may be given priority over transmissions initiated during non-peak working hours. Service level manager 190 may provide an interface (such as a configuration file) to specify parameters to be used in determining the service level objectives in some embodiments. In one embodiment, the specific network ports used for data transmission on behalf of various tasks performed using an application at an endpoint 105 may be selected dynamically, so the service level indicators to be included in data packets by service level manager 190 may not be statically determined on the basis of specific port numbers or port identifiers alone.

Figure 6:
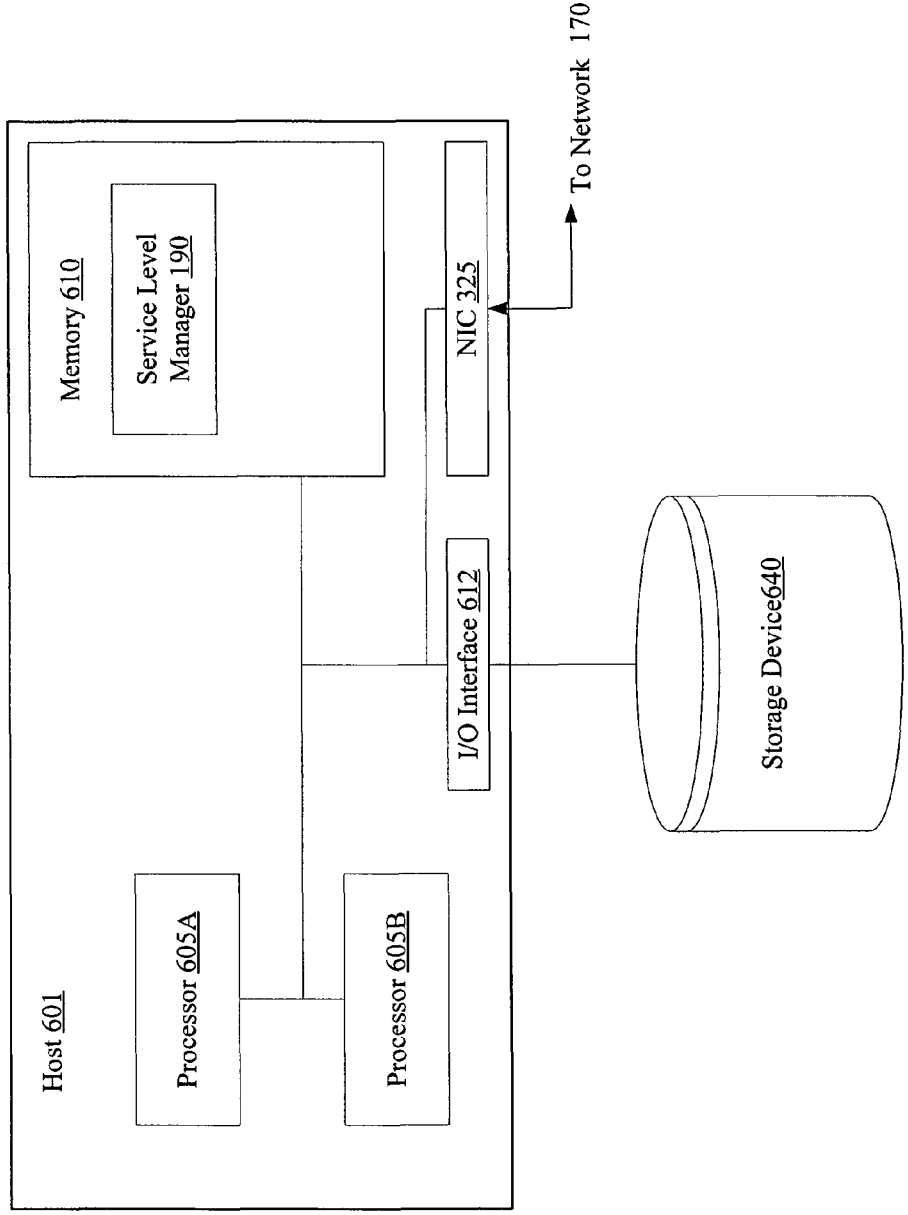
FIG. 6 is a block diagram illustrating constituent elements of a computer host, according to one embodiment.

FIG. 6 is a block diagram of a computer host 601 that may be deployed as needed as an endpoint 105, according to one embodiment. As shown, host 601 may include one or more processors 605, such as processors 605A and 605B. In various embodiments, processors 605 may be implemented using any desired architecture or chip set, such as the SPARC™ architecture from Sun Microsystems or the x86-compatible architectures from Intel Corporation, Advanced Micro Devices, etc. Program instructions that may be executable to implement part or all of the functionality of service level manager 190 (including a network filter driver 315 in some implementations) may be partly or fully resident within a memory 610 at a given point in time, and may also be stored on a storage device 640. Memory 610 may be implemented using any appropriate medium such as any of various types of RAM (e.g., DRAM, SDRAM, RDRAM, SRAM, etc.). In addition to processors 605 and memory 610, host 601 may also include one or more I/O interfaces 612 providing access to storage devices 640, one or more network interface cards (NICs) 325 providing access to network 170, interfaces to display devices (not shown), and the like. Any of a variety of storage devices 640 may be used to store the instructions as well as data for service level manager 190 in different embodiments, including any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 640 may be directly coupled to host 601 in some embodiments (e.g., using the Small Computer Systems Interface (SCSI) protocol), or may be accessible over any desired storage interconnect such as a fiber channel fabric or storage area network (SAN) in other embodiments.

In addition to service level manager 190, memory 610 and/or storage devices 640 may also store operating systems software and/or software for various applications such as a backup manager, a replication service, an e-mail service, a database management service, an ERP application, etc. in various embodiments. In some embodiments, service level manager 190 may be included within an operating system, a storage management software product or another software package, while in other embodiments, service level manager 190 may be packaged as a standalone product. In some embodiments, part or all of the functionality of service level manager 190 may be implemented via one or more hardware devices (e.g., via one or more Field Programmable Gate Array (FPGA) devices) or in firmware.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
a computer system receiving a request to perform a first task of an application running on an operating system of the computer system, wherein the request is received from a client of the application, wherein the first task includes the computer system originating a transmission of a first set of one or more data packets over a network to a destination computer system, wherein the computer system and the destination computer system are both endpoints coupled to the network via respective network interfaces, and wherein the network comprises one or more devices configured to provide different levels of service to data packets based at least in part on service level indicators included in the data packets;
the computer system using a database query to identify a first service level objective associated with the first task;
prior to the computer system originating the transmission of the first set of data packets, the computer system making a request for a service level indicator that satisfies the first service level objective;
the computer system receiving, from a policy engine running on one or more nodes in the network, a response to the request for the service level indicator, wherein the response includes a first service level indicator that has been generated by the policy engine;
the computer system including the first service level indicator within the first set of data packets; and the computer system originating the transmission of the first set of data packets over the network, wherein the originated transmission of the first set of data packets includes the first service level indicator.

2. The method as recited in claim 1, wherein the client is another application running on the operating system of the computer system.

3. The method as recited in claim 1, wherein at least a portion of the first service level indicator is included within a multi-protocol label switching (MPLS) label.

4. The method as recited in claim 1, wherein at least a portion of the first service level indicator is included within an Internet Protocol Version 6 (IPv6) flow label.

5. The method as recited in claim 1, further comprising:
the computer system inserting the first service level indicator in the first set of data packets at a network filter driver layer of a software stack running on the computer system.

6. The method as recited in claim 1, further comprising:
the computer system selecting, using a configurable parameter, the first service level objective from among a plurality of service level objectives available for tasks performed using the application.

7. A tangible, non-transitory computer readable medium storing program instructions executable by one or more processors of a computer system to cause the computer system to:
receive a request to perform a first task of an application running on an operating system of the computer system, wherein the request is received from a client of the application, wherein the first task includes the computer system originating a transmission of a first set of one or more data packets over a network to a destination, wherein the computer system and the destination are both endpoints coupled to the network via respective network interfaces, and wherein the network comprises one or more devices configured to provide different levels of service to data packets based at least in part on service level indicators included in the data packets;
use a database query to identify a first service level objective associated with the first task;
prior to the computer system originating the transmission of the first set of data packets, make a request for a service level indicator that satisfies the first service level objective;
receive, from one or more network devices in the network, a response to the request for the service level indicator, wherein the one or more network devices in the network are configured to implement at least one policy engine, and wherein the response includes a first service level indicator that has been generated by the at least one policy engine;
include the received first service level indicator within the first set of data packets; and
originate the transmission of the first set of data packets over the network, wherein the originated transmission of the first set of data packets includes the first service level indicator.

8. The tangible, non-transitory computer readable medium as recited in claim 7, wherein the client is a user.

9. The tangible, non-transitory computer readable medium as recited in claim 7, wherein at least a portion of the first service level indicator is included within a multi-protocol label switching (MPLS) label.

10. The tangible, non-transitory computer readable medium as recited in claim 7, wherein at least a portion of the first service level indicator is included within an Internet Protocol Version 6 (IPv6) flow label.

11. The tangible, non-transitory computer readable medium as recited in claim 7, wherein the instructions are further executable by the computer system to cause the computer system to: insert the first service level indicator in one or more data packets in the first set of data packets at a network filter driver layer of a software stack.

12. The tangible, non-transitory computer readable medium as recited in claim 7, wherein the instructions are further executable by the computer system to cause the computer system to: select, using a configurable parameter, the first service level objective for the task from among a plurality of service level objectives available for tasks performed using the application.

13. The tangible, non-transitory computer readable medium of claim 7, wherein the application running on the operating system is a web browser.

14. The method of claim 1, wherein the application running on the operating system is a web browser.

15. The tangible, non-transitory computer readable medium of claim 7, wherein the program instructions are further executable to cause the computer system to:
receive a request to perform a second task of the application, wherein the second task includes the computer system originating a transmission of a second set of data packets;
identify a second service level objective associated with the second task;
include a second service level indicator in the second set of data packets; and
originate the transmission of the second set of data packets;
wherein the first and second service level indicators are indicative of the first service level objective having a higher priority than the second service level objective.

16. The tangible, non-transitory computer readable medium of claim 7, wherein the computer system comprises the one or more network devices that are configured to implement the at least one policy engine.

17. The tangible, non-transitory computer readable medium of claim 7, wherein the network comprises a wide area network managed by a telecommunications carrier.

18. The tangible, non-transitory computer readable medium of claim 7, wherein the program instructions are further executable to cause the computer system to:
provide an interface to map each of a plurality of application tasks to a respective one or more service level objectives; wherein the first service level objective is identified, at least in part, based on input received via the interface.

19. The tangible, non-transitory computer readable medium of claim 7, wherein the program instructions are further executable to cause the computer system to: cause the system to select one or more of a plurality of communication ports for the transmission of the first set of data packets.

* * * * *